(12) United States Patent
Perotti

(10) Patent No.: US 9,300,744 B2
(45) Date of Patent: Mar. 29, 2016

(54) CONTEXT SENSITIVE AND SHARED LOCATION BASED REMINDER

(71) Applicant: Plantronics, Inc., Santa Cruz, CA (US)

(72) Inventor: Erik Perotti, Santa Cruz, CA (US)

(73) Assignee: Plantronics, Inc., Santa Cruz, CA (US)

( * ) Notice: Subject to any disclaimer, the term of this patent is extended or adjusted under 35 U.S.C. 154(b) by 278 days.

(21) Appl. No.: 13/745,643

(22) Filed: Jan. 18, 2013

(65) Prior Publication Data

US 2014/0206391 A1 Jul. 24, 2014

(51) Int. Cl.
*H04L 29/08* (2006.01)
*H04W 4/02* (2009.01)
*H04W 4/06* (2009.01)
*H04W 4/18* (2009.01)
*H04W 4/20* (2009.01)

(52) U.S. Cl.
CPC ............ *H04L 67/26* (2013.01); *H04L 67/14* (2013.01); *H04W 4/023* (2013.01); *H04W 4/028* (2013.01); *H04W 4/06* (2013.01); *H04W 4/185* (2013.01); *H04W 4/206* (2013.01)

(58) Field of Classification Search
CPC ....... H04L 67/26; H04L 67/14; H04W 4/023; H04W 4/028; H04W 4/06; H04W 4/185; H04W 4/206
See application file for complete search history.

(56) References Cited

U.S. PATENT DOCUMENTS

| | | | | |
|---|---|---|---|---|
| 7,363,044 B2 * | 4/2008 | Korneluk | ............. | G01S 19/252 455/456.1 |
| 7,583,972 B2 | 9/2009 | Clipsham | | |
| 8,428,561 B1 * | 4/2013 | Vance | ................... | H04W 4/206 455/412.1 |
| 2003/0224762 A1 * | 12/2003 | Lau | ...................... | G06Q 10/109 455/412.2 |
| 2004/0176107 A1 * | 9/2004 | Chadha | ................... | H04W 4/02 455/456.5 |
| 2004/0203847 A1 * | 10/2004 | Knauerhase | ........... | G06Q 10/06 455/456.1 |
| 2004/0266456 A1 * | 12/2004 | Bostrom | ............ | G01C 21/3438 455/456.2 |
| 2005/0144318 A1 * | 6/2005 | Chang | ................... | G06F 1/3203 709/245 |
| 2006/0202819 A1 * | 9/2006 | Adamczyk | ............. | G08B 5/005 340/539.18 |
| 2007/0005363 A1 * | 1/2007 | Cucerzan | ................ | H04W 4/02 704/256 |
| 2007/0149214 A1 * | 6/2007 | Walsh | ................. | H04L 12/1859 455/456.1 |
| 2007/0178909 A1 * | 8/2007 | Doyle | ................... | G01S 5/0027 455/456.1 |
| 2007/0198281 A1 * | 8/2007 | Abernethy | ........... | G06Q 10/109 709/204 |
| 2008/0070593 A1 * | 3/2008 | Altman | ................. | H04L 63/102 455/457 |
| 2008/0148360 A1 * | 6/2008 | Karstens | ................ | H04L 63/10 726/4 |

(Continued)

*Primary Examiner* — Mehmood B Khan
(74) *Attorney, Agent, or Firm* — Chuang Intellectual Property Law

(57) ABSTRACT

Methods and apparatuses for providing reminders are disclosed. In one example, reminders are shared across devices. In one example methods and apparatuses are provided which identify when a subscribing device of a plurality of subscribing devices is at or in proximity to a reminder location, and outputting the reminder message at the subscribing device.

14 Claims, 9 Drawing Sheets

(56) References Cited

U.S. PATENT DOCUMENTS

| | | | |
|---|---|---|---|
| 2009/0191850 A1* | 7/2009 | Cardwell, III | G08B 25/016 455/412.2 |
| 2009/0233629 A1* | 9/2009 | Jayanthi | H04L 12/5865 455/457 |
| 2010/0093371 A1* | 4/2010 | Gehrke | H04W 4/02 455/456.2 |
| 2011/0022659 A1* | 1/2011 | Boyd | G05Q 10/109 709/204 |
| 2012/0003931 A1* | 1/2012 | Eisinger | H04W 48/08 455/41.2 |
| 2013/0130726 A1* | 5/2013 | Deng | H04M 1/72572 455/457 |
| 2013/0138622 A1* | 5/2013 | Ayers | G06Q 10/10 707/706 |
| 2013/0203442 A1* | 8/2013 | LeBlanc | G06Q 10/109 455/456.3 |
| 2013/0244690 A1* | 9/2013 | Huang | G06Q 10/06 455/456.1 |
| 2013/0267253 A1* | 10/2013 | Case | H04W 4/021 455/456.3 |
| 2013/0281128 A1* | 10/2013 | Singh | G06Q 10/109 455/456.3 |
| 2014/0094190 A1* | 4/2014 | Dicke | H04M 1/72572 455/456.2 |
| 2014/0155097 A1* | 6/2014 | Tucker | H04W 4/021 455/456.3 |
| 2014/0227991 A1* | 8/2014 | Breton | H04W 4/22 455/404.2 |

* cited by examiner

| Date/Time | recorded when reminder created |
|---|---|
| Location Recorded | recorded when reminder created |
| Author | recorded when reminder created |
| Reminder Location Source | Extracted from reminder source |
| Reminder Action | Extracted from reminder source |
| Reminder Location Synthesized | N/A |
| Reminder Location Category | N/A |
| Reminder Status | N/A |
| Shared With (Actors) | N/A |
| Completed By | N/A |
| Completed Date/Time | N/A |
| Completed Location | N/A |

FIG. 8

CONTEXT SENSITIVE AND SHARED LOCATION BASED REMINDER

BACKGROUND OF THE INVENTION

Remembering things is difficult, largely because we remember important things at odd times. Some trigger in the grocery store may remind you to call your mother. Some e-mail from your mother may remind you of the galvanized screws you forgot the last time you were at the grocery store. These thoughts are fleeting, however. Soon, the productive mind takes over, and you are returned to the task at hand, and those incidental thoughts pass by unattended and quickly forgotten.

A mobile computing device, such as a mobile phone, may be utilized to record reminders. For example, one could type a reminder note or record a voice memo on the mobile device. However, retrieving the reminder at the right time so it will be useful is difficult. Furthermore, the user may wish the reminder to be available to others and that the reminder be provided to the other users at a time when it will be most useful.

As a result, improved methods and apparatuses for providing and sharing reminders are needed.

BRIEF DESCRIPTION OF THE DRAWINGS

The present invention will be readily understood by the following detailed description in conjunction with the accompanying drawings, wherein like reference numerals designate like structural elements.

FIG. 8 illustrates a sample reminder record.

DESCRIPTION OF SPECIFIC EMBODIMENTS

Figure 1:
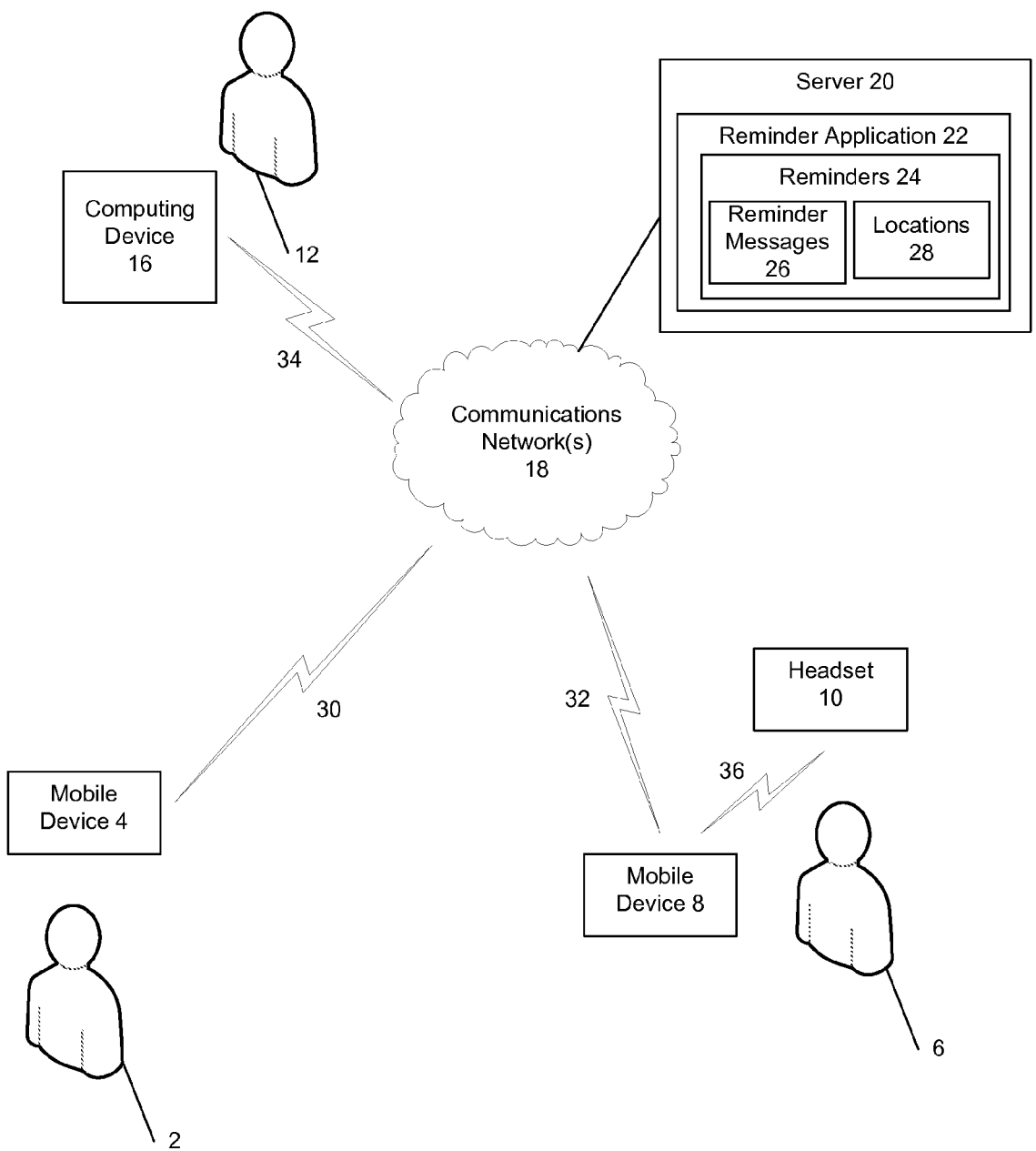
FIG. 1 illustrates a system for providing reminders in one example.

Methods and apparatuses for providing reminders are disclosed. The following description is presented to enable any person skilled in the art to make and use the invention. Descriptions of specific embodiments and applications are provided only as examples and various modifications will be readily apparent to those skilled in the art. The general principles defined herein may be applied to other embodiments and applications without departing from the spirit and scope of the invention. Thus, the present invention is to be accorded the widest scope encompassing numerous alternatives, modifications and equivalents consistent with the principles and features disclosed herein. For purpose of clarity, details relating to technical material that is known in the technical fields related to the invention have not been described in detail so as not to unnecessarily obscure the present invention.

In one example, a method includes receiving a user voice communication, and processing the user voice communication to identify a reminder location and a reminder message. The method further includes outputting the reminder message when a current location is the reminder location.

In one example, a system for providing reminders includes a first computing device operable to receive a first reminder, the first reminder including a first reminder message and a first reminder location, and a second computing device operable to receive a second reminder, the second reminder including a second reminder message and a second reminder location. The system further includes a server device configured to receive the first reminder and the second reminder and initiate a first reminder output or a second reminder output responsive to the location of the first computing device or the second computing device.

In one example, a non-transitory computer readable storage memory stores instructions that when executed by a computer cause the computer to perform a method for outputting reminders. The method includes receiving a first reminder from a first subscribing device, the first reminder including a first reminder message and a first reminder location, and storing the first reminder. The method includes receiving a second reminder from a second subscribing device, the second reminder including a second reminder message and a second reminder location, and storing the second reminder. The method further includes tracking a current location of the first subscribing device and a current location of the second subscribing device, identifying when the current location of the first subscribing device is at the second reminder location, and responsively outputting the second reminder message at the first subscribing device.

In one example, a method includes storing a reminder message associated with a reminder location and tracking a current location of a plurality of subscribing devices. The method further includes identifying when a subscribing device of the plurality of subscribing devices is at or in proximity to a reminder location, and outputting the reminder message at the subscribing device.

In one example embodiment, a user presses a headset button and records a memo. A reminder application executing on the headset, a mobile device or a server utilizes the memo in concert with user location to provide better timed reminder messages. A user records a memo, and the memo is tagged with a location for receiving the memo. When a user mobile device is within range of the tagged location, this operates as a trigger to output the memo to the user.

In one usage scenario, for example: (1) A user, sitting at work, leaves the following memo for himself: "Pick up asparagus at the grocery store", (2) The user's computer passes this message to the cloud, (3) Logic in the cloud parses the message into two pieces, the location and the message, and (4) When the user's phone visits the location mentioned in the memo, it should prompt the user to review it.

When the headset button is pressed, the user prefaces the reminder message/action with a location. For example, the following are example types of location analysis that are performed: (1) frequently visited locations (e.g., 'home'), (2) multiple locations that serve a common role (e.g., 'grocery store'), (3) local terms for locations and things, and (4) Loose terms that people in a given geography use to describe a place (e.g., 'the park'). Additionally, the reminder application may ask clarifying questions when the user's meaning is unclear.

When a user records a message, the reminder application expects an associated location. More specifically, a location that is meaningful to that user. For example, when a user says "Don't forget to pick up Jennifer's lunchbox from school,"

the reminder application may determine that "school"=Oak Rd. Elementary School, which is where Jennifer goes to school. The reminder application already knows this based on previous locations. For example, the reminder application identifies that the user mobile device goes to Oak Rd. Elementary School at least three days a week, and has done so for the past 6 years. And it doesn't go to other schools with anything close to that frequency.

In a further example, a user says "Don't forget to pick up a toolbox from the hardware store." The reminder application may respond "Which store?" The user may have a specific store in mind or it may not matter. In this case, the second question may be necessary to get a precise read on the desired location.

In a further example, a user may say "Don't forget to pick up rolls from Kelly's", that could mean a friend named Kelly, a bakery, or a grocery store. However, "Kelly's" may be a well known bakery in Santa Cruz. A network-effect to improve location analysis may be used to identify that "Kelly's" is a bakery and the desired location when a user is in Santa Cruz. In a further example, when someone mentions 'the game' tonight, the system may make an educated guess as to what game that is, and therefore, where it is. The reminder application may utilize heuristics in various location tagging models.

In one example, memos may be stored in the cloud. If the user is carrying any subscribed device, this device will receive the memo. When one of the user's devices visits that location, an alert should display, informing the user that she has a reminder. These would be aggregated if there are multiple reminders for the same location. The user is allowed to defer reminders, if the timing to attend to the reminder is not convenient. Reminders can be retrieved on devices with location services. Reminders may be shared, within a family, for example. So, a reminder to pick up dish-soap at the grocery could be retrieved by either spouse on any subscribing device.

In one example, voice provides an easy way to record messages. These recordings may be played back as an audio recording or text messages may be used as an alternate playback medium. Reminders may also be input as text instead of using voice recordings.

In one example, a user is provided with a previously recorded reminder before the user travels to the particular location tagged to the reminder message. The system identifies that the user will be travelling to the tagged location in the near future. For example, the calendaring application on a user's device (or another user's subscribing device) may be utilized to determine and predict a user's future location at a given time. In a further example, where a user is following map based driving directions, the user's route and destination may be used to predict the user's future location.

In one example, a user subscribes to location based reminders from a service provider. When a user device is at a certain location, the location based reminders are output. In one usage scenario, the reminders are data associated with the present user location. For example, the data may be an audio narrative or textual data for a place of interest that the user is currently visiting.

FIG. 1 illustrates a system for providing reminders in one example. The system includes a mobile device 4 in proximity to a user 2, a mobile device 8 in proximity to a user 6, a computing device 16 in proximity to a user 12, and a server 20 capable of communications therebetween via one or more communication network(s) 18. User 6 may utilize a headset 10 with mobile device 8 over wireless link 36 to receive reminder inputs or output reminder messages. For example, communication network(s) 18 may include an Internet Protocol (IP) network, cellular communications network, public switched telephone network, IEEE 802.11 wireless network, Bluetooth network, or any combination thereof.

Mobile device 4 and mobile device 8 may, for example, be any mobile computing device, including without limitation a mobile phone, laptop, PDA, headset, tablet computer, or smartphone. In a further example, mobile device 8 may be any device worn on a user body, including a bracelet, wristwatch, etc. Computing device 16 may, for example, be a desktop personal computer (PC), notebook computer, or a mobile device.

Computing device 16 is capable of communication with server 20 via communication network(s) 18 over network connection 34. Network connection 34 may be a wired connection or wireless connection. In one example, network connection 34 is a wired or wireless connection to the Internet to access server 20. For example, computing device 16 includes a wireless transceiver to connect to an IP network via a wireless Access Point utilizing an IEEE 802.11 communications protocol.

Similarly, mobile device 4 and mobile device 8 are capable of communication with server 20 via communication network(s) 18 over network connections 30 and 32, respectively. In one example, network connections 30 and 32 are wireless cellular communications links.

Server 20 includes a reminder application 22 interfacing with one or more of mobile device 4, mobile device 8, and computing device 16 to receive from and provide reminders to users 2, 6, and 12. In one example, reminder application 22 stores reminders 24 composed of reminder messages 26 and associated reminder locations 28.

In one example, mobile device 4 is operable to receive a first reminder, the first reminder including a first reminder message and a first reminder location. Mobile device 8 is operable to receive a second reminder, the second reminder including a second reminder message and a second reminder location. Server 20 is configured to receive the first reminder and the second reminder and initiate a first reminder output or a second reminder output responsive to the location of the mobile device 4 or the mobile device 8. The second reminder output is initiated when the mobile device 4 is at the second reminder location or the mobile device 8 is at the second reminder location. The first reminder output is initiated with the mobile device 8 is at the first reminder location or the mobile device 4 is at the first reminder location. In one embodiment, the first reminder output is a text message including the first reminder message and the second reminder output is a text message including the second reminder message.

In one example operation, reminder application 22 receives a user voice communication from mobile device 4, and processes the user voice communication to identify a reminder location and a reminder message. Where necessary, reminder application 22 may output a follow up query to request the user narrow or clarify the reminder location. The reminder message is output when a current location of the mobile device 4 is the reminder location. In one implementation, reminder application 22 sends a text message including the reminder message to mobile device 4. In a further implementation, the reminder message is output by playing back the user voice communication to the user at the reminder location. In one example, the reminder message is output at mobile device 8 when user 6 and mobile device 8 are at the reminder location. In this example, mobile device 8 is considered a "subscribing device" which subscribes to reminders received at mobile device 4.

In one example, processing the user voice communication to identify a reminder location and a reminder message includes identifying a location role or category from the user voice communication, wherein the reminder location is any one of multiple locations satisfying the location role or category. For example, any grocery store may satisfy a "grocery store" reminder location.

In one example, processing the user voice communication to identify a reminder location and a reminder message includes identifying a specific location from a generic location. For example, identifying the specific location may include processing a history of visited locations. For example, only the location "Oak Rd. Elementary" may satisfy a "school" reminder location.

In a further example operation, reminder application 22 receives a first reminder from a mobile device 4, the first reminder including a first reminder message and a first reminder location, and stores the first reminder. Reminder application 22 receives a second reminder from a mobile device 8, the second reminder including a second reminder message and a second reminder location, and stores the second reminder. Reminder application 22 tracks a current location of the mobile device 4 and a current location of the mobile device 8, identifying when the current location of the mobile device 4 is at the second reminder location, and responsively outputs the second reminder message at the mobile device 4. For example, the reminder application 22 may transmit the second reminder message over network(s) 18 to the mobile device 4. Reminder application 22 may output an update message at the mobile device 8 indicating the second reminder message has been delivered to the mobile device 4 at the second reminder location.

Figure 2:
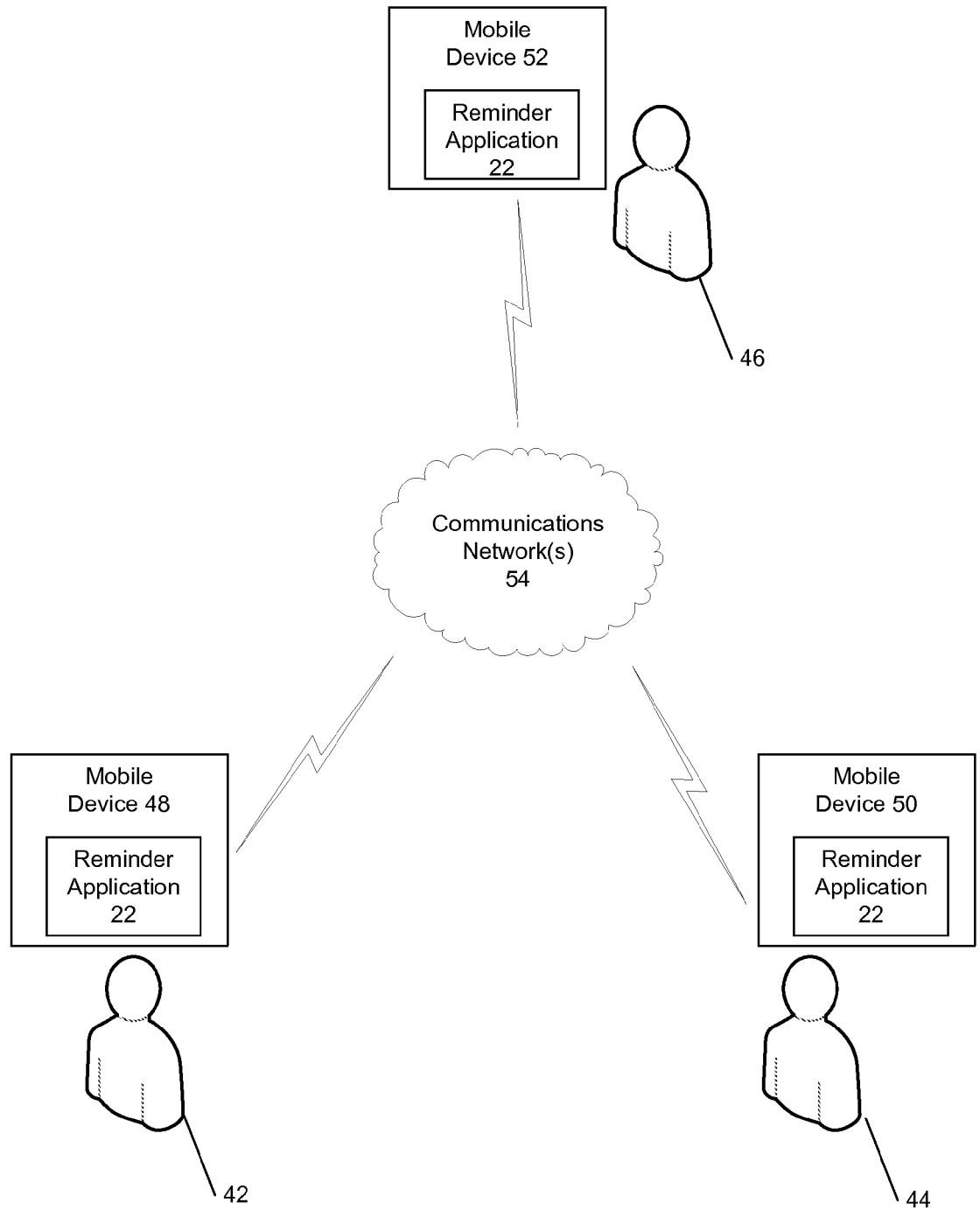
FIG. 2 illustrates a system for providing reminders in a further example.

FIG. 2 illustrates a system for providing reminders in a further example. The system includes a mobile device 48 in proximity to a user 42, a mobile device 50 in proximity to a user 44, and a mobile device 52 in proximity to a user 46 capable of communications therebetween via one or more communication network(s) 54. For example, communication network(s) 54 may include an Internet Protocol (IP) network, cellular communications network, public switched telephone network, IEEE 802.11 wireless network, Bluetooth network, or any combination thereof. Mobile device 48, mobile device 50, and mobile device 52 may communicate with each other using near field communications (NFC), personal area networks, local area networks, and wide area networks.

As shown in FIG. 2, mobile device 48, 50, and 52 each include a reminder application 22 performing functions substantially similar to that described above in reference to FIG. 1. In this embodiment, the reminder applications 22 are synchronized such that any reminder received at one mobile device is transmitted to and stored at the other mobile devices. When one of the mobile devices is at a reminder location, the reminder application 22 outputs the reminder message. The reminder may be indicated in the form of a visual, audible, or vibration alert prior in conjunction with outputting the reminder message.

Figure 3A:
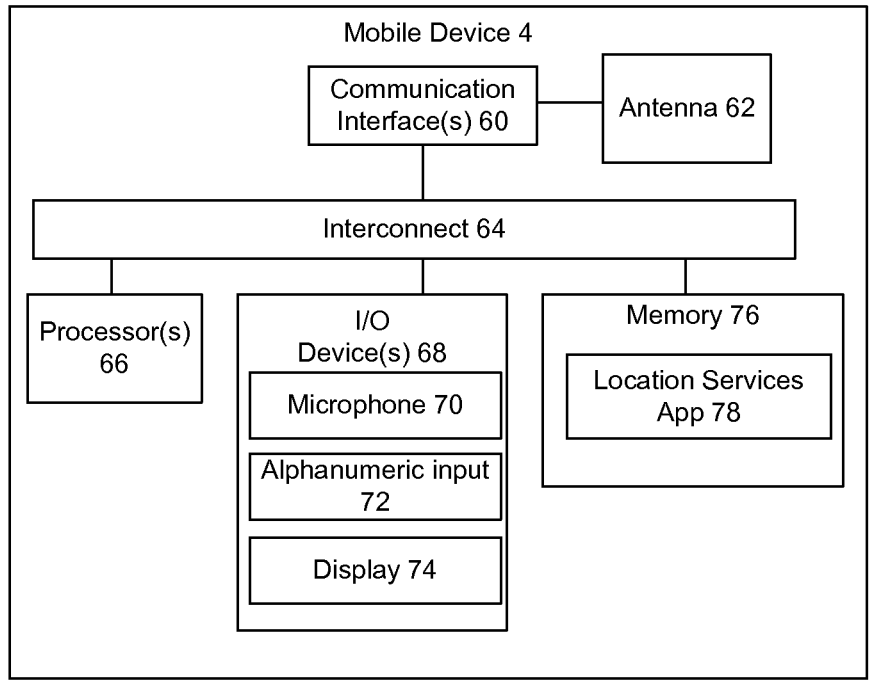
FIG. 3A illustrates a simplified block diagram of a mobile device shown in FIG. 1.

FIG. 3A illustrates a simplified block diagram of the mobile device 4 shown in FIG. 1 in one example. Mobile device 8 and computing device 16 may be substantially similar. Mobile device 4 includes input/output (I/O) device(s) 68 configured to interface with the user, including a microphone 70 operable to receive a user voice input or other audio. I/O devices 68 include an alphanumeric input device 72, such as a keyboard, touchscreen, and/or a cursor control device. I/O device(s) 68 includes a display device 74, such as a liquid crystal display (LCD). I/O device(s) 68 may also include additional input devices and additional output devices, such as a speaker. I/O device(s) 68 include a user interface operable to receive and program a user reminder input. For example, the user reminder may be a voice input or an alphanumeric key input. In one example, the user may enter a precise location which is tagged to a reminder message or alert by entering or selecting via a graphical user interface an exact address (e.g., street number, street name, and city) for the target location. The user may select from a list of previously visited locations or from a list of "favorite" locations stored in a location database. The target location may be stored in actual latitude and longitude coordinates.

When a user selects to enter or program a reminder, the user may select from one or more options of actions to be performed when the reminder is triggered (e.g., when the mobile device is at the target location). These options include setting a text message to be delivered, delivering or outputting a speech-to-text conversion of a memo input by voice, playing back a reproduction of the recorded voice memo, or even initiating a call from the mobile device 4. Alternatively, a default action may be used without the need for the user to specify the action to be performed.

The mobile device 4 includes a processor 66 configured to execute code stored in a memory 76. Processor 66 executes a location services application 78 to identify a current location of mobile device 4. In one example, the location of the mobile device 4 may be continuously monitored or monitored periodically as needed. In one example, mobile device 4 utilizes the Android operating system. Location services application 78 utilizes location services offered by the Android device (global positioning system (GPS), WiFi, and cellular network) to determine and log the location of the mobile device. For example, mobile device 4 includes a GPS receiver for use by location services application 78. The GPS receiver has an antenna to receive GPS information, including location information to indicate to the mobile device 4 where it is geographically located. In further examples, one or more of GPS, WiFi, or cellular network may be utilized to determine location. In certain cases, the GPS may not be able to provide a location if a satellite signal is blocked or obstructed by buildings, tunnels, or trees. The cellular network may be used to determine the location of mobile device 4 utilizing cellular triangulation methods.

In one example, a Google Maps API is used which utilizes an Android phone's "location services" to compute the map location of the mobile device 4. These services consist of 2 options: GPS and Network (Cell Phone Location and Wi-Fi). The best source from whichever service is turned on and providing data is utilized. The combination of data supplied by one or more of the primary three location services (GPS, WiFi, and cell network) provide a high level of location accuracy.

In one example, mobile device 4 may include a reminder application to prompt the user to speak or enter a reminder. The reminder application may parse the user input to identify the reminder message and reminder location from the message. Once the desired target reminder location is identified, the latitude and longitude of the location may be used and/or Google maps may be used to determine when the mobile device 4 is at the target reminder location or within a certain radius of the reminder location.

While only a single processor 66 is shown, mobile device 4 may include multiple processors and/or co-processors, or one or more processors having multiple cores. The processor 66 and memory 76 may be provided on a single application-specific integrated circuit, or the processor 66 and the memory 76 may be provided in separate integrated circuits or other circuits configured to provide functionality for executing program instructions and storing program instructions and other data, respectively. Memory 76 also may be used to store temporary variables or other intermediate information during execution of instructions by processor 66. For example, memory 76 may include pre-stored audio prompts for output through the device speaker which prompt the user to input a reminder.

Mobile device 4 includes communication interface(s) 60, one or more of which may utilize an antenna 62. The communications interface(s) 60 may also include other processing means, such as a digital signal processor and local oscillators.

Communication interface(s) 60 may provide wireless communications using, for example, Time Division, Multiple Access (TDMA) protocols, Global System for Mobile Communications (GSM) protocols, Code Division, Multiple Access (CDMA) protocols, and/or any other type of wireless communications protocol. The specific design and implementation of the communications interfaces of the mobile device 4 is are dependent upon the communication networks in which the device is intended to operate.

In one example, communications interface(s) 60 include one or more short-range wireless communications subsystems which provide communication between mobile device 4 and different systems or devices. In one embodiment, communication interface(s) 60 may provide access to a local area network, for example, by conforming to IEEE 802.11b and/or IEEE 802.11g standards, and/or the wireless network interface may provide access to a personal area network, for example, by conforming to Bluetooth standards. For example, the short-range communications subsystem may include an infrared device and associated circuit components for short-range communication or a near field communications (NFC) subsystem.

Figure 3B:
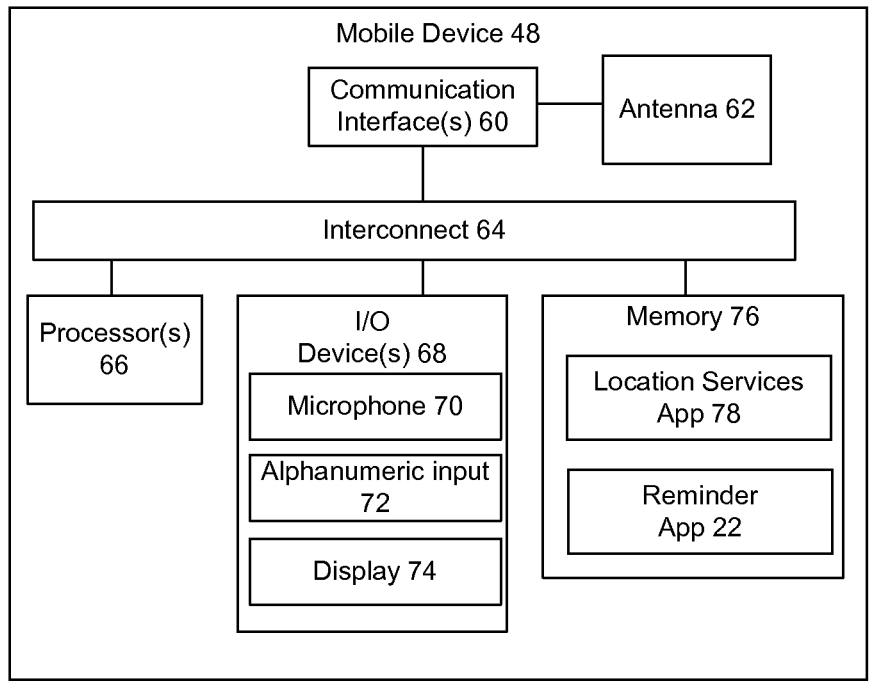
FIG. 3B illustrates a simplified block diagram of a mobile device shown in FIG. 2.

Memory 76 may include both volatile and non-volatile memory such as random access memory (RAM) and read-only memory (ROM). Memory 76 may include a variety of applications executed by processor 66 capable of receiving and outputting reminders for actions to be performed (i.e., "to do" tasks), events, and miscellaneous memorandum. Memory 76 may include a calendar application, task manager application, and contacts manager storing contacts to share reminders.

Where functions of the reminder application are performed locally at the mobile device (as shown in FIG. 3B) as opposed to at a server, these applications may be integrated with a reminder application to perform the functions described herein. Alternatively, the reminder application may be implemented separately from one or more of these applications and may include one or more application programming interfaces (API) to integrate operations of the reminder application. Information utilized to assist in identifying reminder locations, reminder records, frequently visited locations, stored locations, and location history with may be stored in memory 76. Interconnect 64 may communicate information between the various components of mobile device 4.

Instructions may be provided to memory 76 from a storage device, such as a magnetic device, read-only memory, via a remote connection (e.g., over a network via communication interface(s) 60) that may be either wireless or wired providing access to one or more electronically accessible media. In alternative examples, hard-wired circuitry may be used in place of or in combination with software instructions, and execution of sequences of instructions is not limited to any specific combination of hardware circuitry and software instructions.

Mobile device 4 may include operating system code and specific applications code, which may be stored in non-volatile memory. An example of an operating system may include Android made by Google. For example the code may include drivers for the mobile device 4 and code for managing the drivers and a protocol stack for communicating with the communications interface(s) 60 which may include a receiver and a transmitter and is connected to an antenna 62. Communication interface(s) 60 provides a wireless interface for communication with server 20, and/or mobile device 8 and computing device 16.

In various embodiments, the techniques of FIG. 4-6B discussed below may be implemented as sequences of instructions executed by one or more electronic systems. The instructions may be stored by the mobile device 4 or the instructions may be received by the mobile device 4 (e.g., via a network connection).

FIG. 3B illustrates a simplified block diagram of the mobile device 48 shown in FIG. 2 in one example. Mobile devices 50 and 52 may be substantially similar. Mobile device 48 is substantially similar to mobile device 4 described above in reference to FIG. 3A, with the addition of a reminder application 22 stored in memory 76 and executable by processor(s) 66 performing functions described herein.

Figure 4:
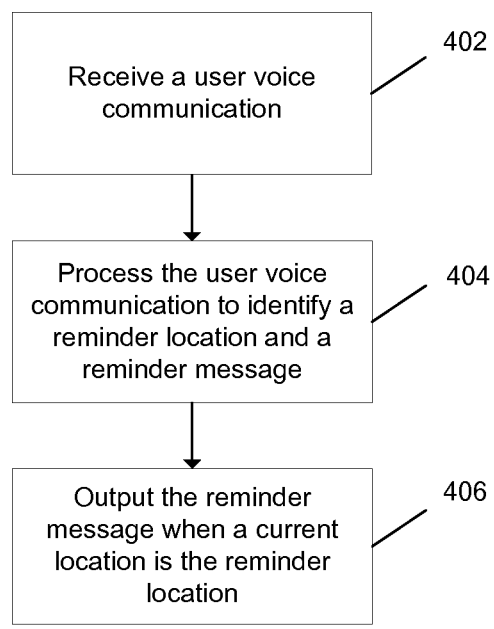
FIG. 4 is a flow diagram illustrating providing reminders to users in one example.

FIG. 4 is a flow diagram illustrating providing reminders to users in one example. At block 402, a user voice communication is received. At block 404, the user voice communication is processed to identify a reminder location and a reminder message. In one example, the method further includes outputting a follow up query to request narrowing of a reminder location. In one example, processing the user voice communication to identify a reminder location and a reminder message includes a location role or category from the user voice communication, wherein the reminder location is any one of multiple locations satisfying the location role. In one example, processing the user voice communication to identify a reminder location and a reminder message includes identifying a specific location from a generic location. For example, identifying the specific location comprises processing a history of visited locations.

At block 406, the reminder message is output when a current location is the reminder location. In one example, a text message such as an instant message or email is output or the user voice communication is output. In one example, the user voice communication is received at a first device and the reminder message is output at a second device when a second device current location is the reminder location.

Figure 5:
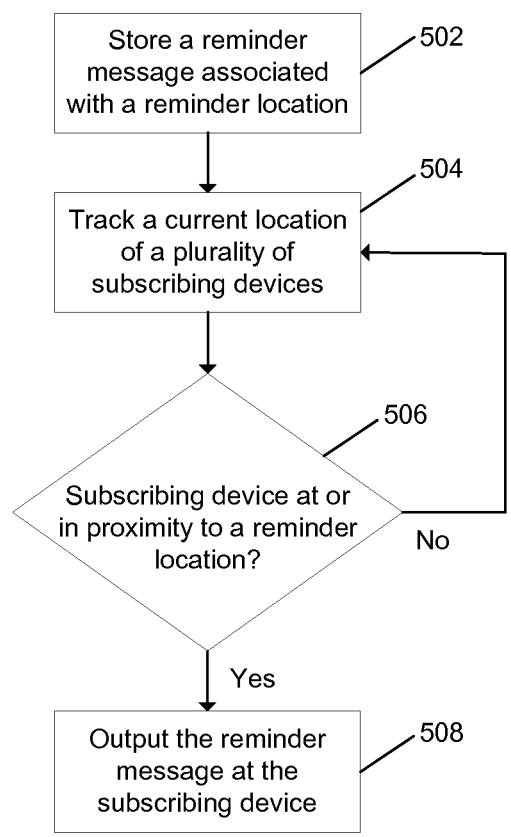
FIG. 5 is a flow diagram illustrating providing reminders to users in a further example.

FIG. 5 is a flow diagram illustrating providing reminders to users in a further example. At block 502, a reminder message associated with a reminder location is stored. In one example, the reminder message includes a message originator. In one example, the reminder message is synchronized across a plurality of subscribing devices.

At block 504, a current location of a plurality of subscribing devices is tracked. In one example, location data is sent from each device to a central server for tracking. In a further example, tracking is performed locally at each device. At decision block 506 it is determined whether a subscribing device of the plurality of subscribing devices is at or in proximity to a reminder location. If no at decision block 506, the process returns to block 504.

If yes at decision block 506, at block 508 the reminder message is output at the subscribing device. In one example, a subscribing device retrieves the reminder message when it is at or in proximity to the reminder location. In one example, the reminder message is input at a first subscribing device of the plurality of subscribing devices and output at a second subscribing device of the plurality of subscribing devices. In one example, an update message is output at the first subscribing device indicating that the reminder message has been output at the second subscribing device.

Figure 6A:
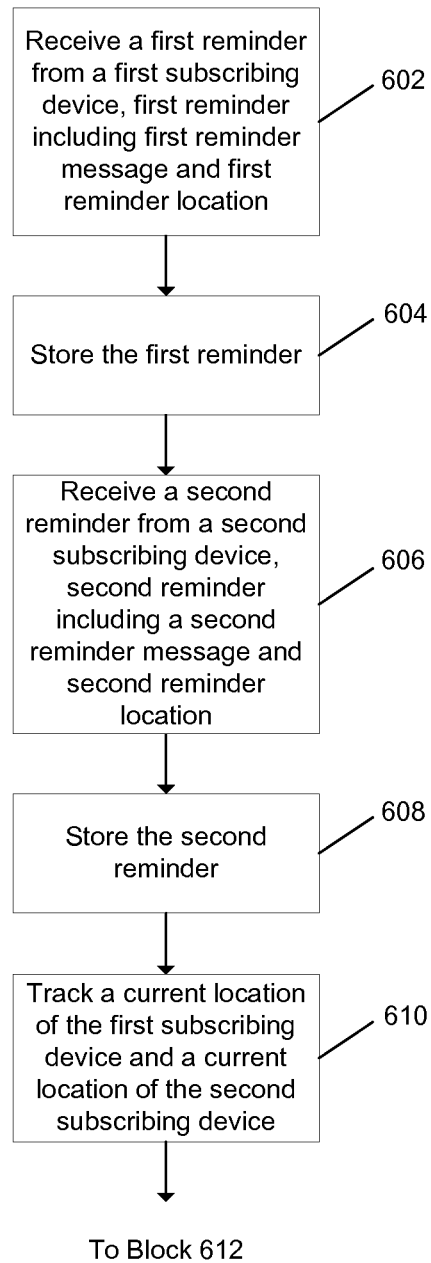
FIGS. 6A and 6B are a flow diagram illustrating providing reminders to users in a further example.
Figure 6B:
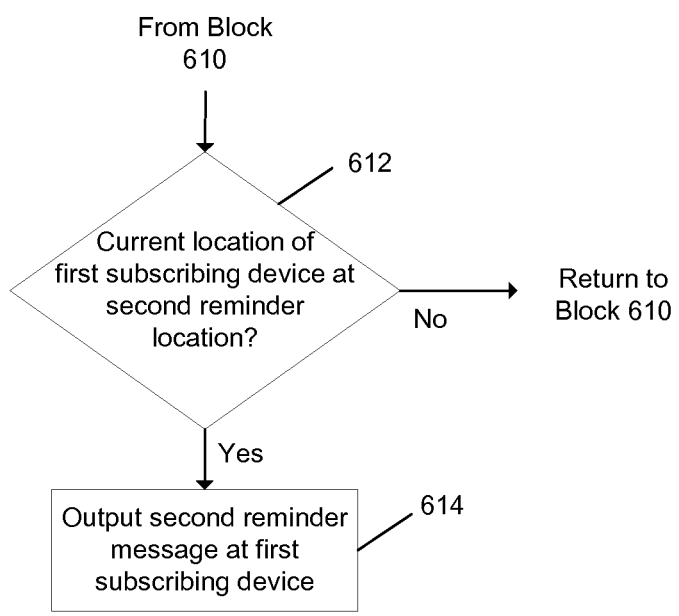

FIGS. 6A and 6B are a flow diagram illustrating providing reminders to users in a further example. At block 602, a first reminder from a first subscribing device is received, the first reminder including a first reminder message and a first reminder location. At block 604, the first reminder is stored.

At block 606, a second reminder from a second subscribing device is received, the second reminder including a second reminder message and a second reminder location. At block 608, the second reminder is stored.

At block 610, a current location of the first subscribing device and a current location of the second subscribing device is tracked. At decision block 612, it is determined if the current location of the first subscribing device is at the second reminder location.

If no at decision block 612, the process returns to block 610. If yes at decision block 612, at block 614, the second reminder message is output at the first subscribing device. In one example, the second reminder message is a text message. An update message may be output at the second subscribing device indicating the second reminder message has been delivered to the first subscribing device at the second reminder location. In one example, outputting the second reminder message at the first subscribing device includes transmitting the second reminder message over a network to the first subscribing device. In a further example, it is determined if the current location of the second subscribing device is at the second reminder location, in which case the second reminder message is output at the second subscribing device.

Figure 7:
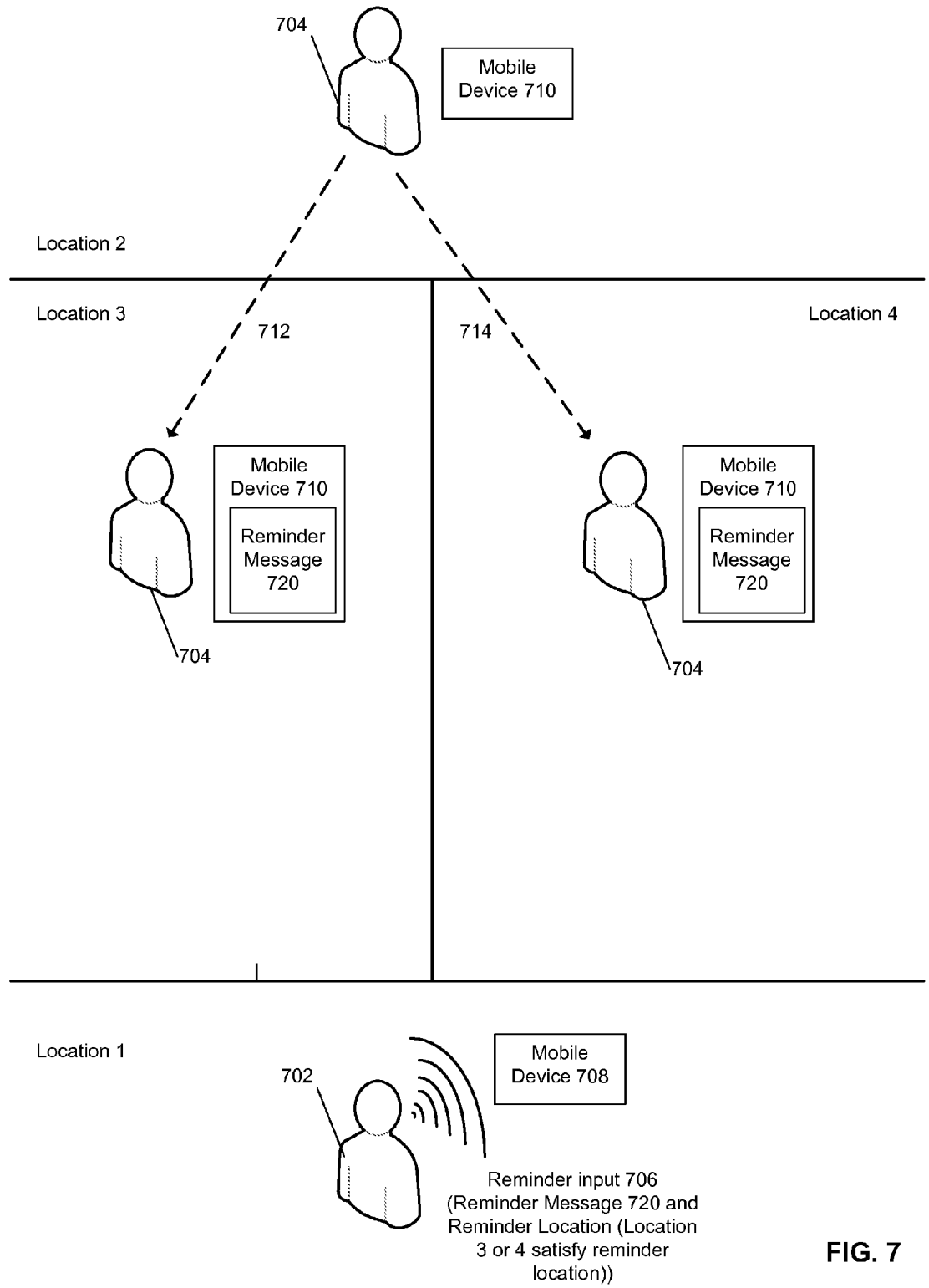
FIG. 7 illustrates a usage scenario whereby a location based reminder is output to a user.

FIG. 7 illustrates a usage scenario whereby a location based reminder is output to a user. A user 702 at a location 1 inputs a reminder input 706 at a mobile device 708. For example, reminder input 706 is a voice input which is detected by a microphone at mobile device 708. The reminder input 706 is processed to identify a reminder location and a reminder message 720. It is determined that a location 3 or a location 4 will satisfy the reminder location.

At location 2, a user 704 has a mobile device 710. Mobile device 710 is a subscribing device to reminders input at mobile device 708. In movement scenario 712, user 704 and mobile device 710 move from location 2 to location 3. Upon detection that mobile device 710 is at location 3, reminder message 720 is output at mobile device 710. In movement scenario 714, user 704 and mobile device 710 move from location 2 to location 4. Upon detection that mobile device 710 is at location 4, reminder message 720 is output at mobile device 710.

Sample Usage Scenarios

In one example, the system and reminder application shown and described in reference to FIG. 1 is used in the following scenario. Assume the user enters the following reminder: "Pick up a loaf of bread at Kelly's." In addition to the reminder content, a record at the reminder application also has the following information: (1) Time/Date stamp, (2) Location where reminder was recorded, and (3) Person who recorded the reminder.

This record is transferred to the cloud, where analysis is performed to parse the reminder into two pieces: (1) Location for reminder action, (2) Action to be performed. Additionally, information is maintained about reminder completion. FIG. 8 illustrates a sample record at this stage.

Once the source record is stored in the cloud, location analysis by the reminder application begins:

(1) Reminder is parsed (location from reminder action). Location is discernable because in natural language, there should be triggers (near, by, at, and others). If natural language processing is difficult, a first pass might be to create a pattern for recording: Location; action
(2) Action stored
(3) Reminder location analysis. In one example, relative location is implemented. For example, a location area may be bounded by a predetermined radius from the user's current location. Location need not be a geo-location. It may be a rendezvous with someone or a time-bounded event.

Direct Match

If there is a direct match, no analysis is needed. For example, a complete store name: "Kelly's Bakery". If the user is proximate to Kelly's Bakery, she would receive the reminder notification. In this situation, she would be presented with several options: Complete; Snooze/Remind Later; Add Locations; Delete.

Frequent Locations

If the reminder location is a category, "hardware store" or "grocery" for example, there are multiple ways to approach by the reminder application. In one example the reminder application defines locations frequented by this user. For example, a user parks her car in a mini-mall with a hardware store a few times a week. Assuming that the first time she arrives there, she receives the reminder notification. She would have options from the reminder application to: Complete; Snooze/Remind Later; Don't Like this Business; Delete.

Network Effect

The user may use a nickname or some other arbitrary name for a location. For example, a user may refer to "Pro Build Building and Construction" as "San Lorenzo". This nickname comes from a prior name of this establishment. A search for "San Lorenzo" may yield a multitude of search results. If the engine cannot uniquely identify a reminder location, it will need user clarification. Perhaps something as simple as, "is there another name for this?" Tor the user, this definition will be retained for future use.

But, this may information may be additionally useful to the wider community. Over time, as data is collected by the user community, it may become evident that there is a strong correlation between a location and nickname. When this situation occurs, the system will continue to require confirmation, but the clarifying question may change to, "did you mean _____?"

In the unlikely scenario that this nickname is only ascribed to exactly one location (or chain), and the data is deemed sufficient, this follow-on question may be dropped for subsequent users.

It is also possible that a user does not know the proper place name. For example, in Santa Cruz, Calif., "Surfer Dude" almost certainly means a certain statue on West Cliff Drive in Santa Cruz. It is a common point to reconnoiter for runners and surfers alike, yet it has no address. If the answer to, "is there another name for this?" happens to be, "no", the first user would be asked to place it on a Google or similar map. Supporting data comes in the form of asking secondary users to confirm this location, rather than asking them to locate it on a map. With a small amount of additional supporting data, this location would become assigned to that nickname.

One's personal community may provide useful context for understanding location. For example, if the reminder application has Facebook or Twitter integration, the user's Facebook Friends will have useful location information. For example, if a friend uses a seemingly ambiguous term and clarifies the location intention, then there is a reasonable chance that my use of the same ambiguous term may coincide. In fact, it's more likely that my personal community will use the same terms than the Santa Cruz community as a whole.

Additionally, a user's friend may be used to provide reminder context. If, for example, a user's spouse talks about "our house", both the user and the user spouse understand the intended location. Additionally, if a first user's friend and the user are "meeting for beers on Thursday" the location is known if not otherwise stated. The location of "beers" means someplace else when talking about a second friend. If a user friend Doug 'checks in' to The Red while the user is there, or the user includes him in a status post, the reminder notification is output. Into the future, the same applies. If some device that he or the user has allows us to know that the two are in the same place (and there is some known relationship between the individuals), the reminder would display.

If the location is dynamic, like an event, the analysis engine of the reminder application uses the volume of data to help deduce the user's intention. For example, if a strong pattern can be established for "the Comets' game on Saturday night", synergy may exist, whereby one user may provide location information that can be leveraged by other users. In rural areas, "the game" may provide adequate detail.

Additionally, as discussed below, reminders provide network support. One can assume that a reminder could be something like weight loss reminder, "eat the salad at Restaurant X". The reminders are milestones toward a larger goal. Socially, one can imagine getting supporting posts from well-wishers if completed actions are shared with the user's network.

Once a reminder has been properly parsed, and that it has both a location and an action, it may be shared with other actors. By default, an action may be private, meaning that the action author would be the only person who would be aware of this reminder. There are a few common ways to share via the cloud: share at the time of record creation; share from some list view (batch); lastly, assume that all records are to be shared.

In one implementation, the reminder application shares an activity at the time the record is created. From a user's perspective, after she has created the reminder, the user would optionally be able to define additional actors. From a user experience perspective, in one example the user would add actors within a few seconds of recording the action or the application would go back to a state where the user can record additional reminders. In a further example, the user defines sharing preferences. For example, between a couple. In this case, all reminders are co-owned.

Assuming that the reminder has been shared, a push notification is sent to any additional actors, informing them that they have a new reminder. When that actor opens the application, that (and any other accumulated) reminder(s) would be downloaded.

Reminders may be shared among predefined groups or teams. Each reminder is shared with the entire team. Given this model, a user may belong to zero, one or more teams. Team-oriented status updates may be sent, "thumbs up" and other words of encouragement between team members, and percent complete toward a larger goal.

Completing Actions

Assuming that some community of actors share one or more incomplete reminder actions, the next step is to have someone perform that action. When the notification is presented, the user would tap the 'complete' button on one of her devices. This would send an update to the reminder ID and status to the cloud. The server logic would then send push notifications to any other actors participating in a reminder, indicating that a reminder had been completed.

The next time another actor opens the application, the reminder application indicates the completion data (e.g., time/date, performed by, location). There may be a "Like" or status functionality for passive actors, which would be a way of thanking/praising the actor who completed the action. A user may reject another person's reminder and remove themselves from the list of action actors. The owner's deletion removes the reminder for all actors.

Instructions of the various software applications (e.g., reminder application, location services application, calendar application, memorandum application) discussed herein are loaded for execution on a corresponding control unit or processor. The control unit or processor may include a microcontroller, a microprocessor, a processor module, or subsystem including one or more microprocessors and microcontrollers, or other control or computing devices. The term controller refers to either software or hardware, or a combination of both, and may refer to multiple software or hardware modules.

While the exemplary embodiments of the present invention are described and illustrated herein, it will be appreciated that they are merely illustrative and that modifications can be made to these embodiments without departing from the spirit and scope of the invention. For example, methods, techniques, and apparatuses described as applying to one embodiment or example may also be utilized with other embodiments or examples described herein. Thus, the scope of the invention is intended to be defined only in terms of the following claims as may be amended, with each claim being expressly incorporated into this Description of Specific Embodiments as an embodiment of the invention.

What is claimed is:

1. One or more non-transitory computer-readable storage media having computer-executable instructions stored thereon which, when executed by one or more computers, cause the one more computers to perform operations comprising:
receiving a first reminder from a first device, the first reminder comprising a first reminder message and a first reminder location;
storing the first reminder;
receiving a second reminder from a second device, the second reminder comprising a second reminder message and a second reminder location;
storing the second reminder;
tracking a current location of the first device and a current location of the second device;
identifying when the current location of the first device is at the second reminder location and responsively outputting the second reminder message at the first device; and
outputting an update message at the second device indicating the second reminder message has been delivered to the first device at the second reminder location.

2. The one or more non-transitory computer-readable storage media of claim 1, wherein outputting the second reminder message at the first device comprises transmitting the second reminder message over a network to the first device.

3. The one or more non-transitory computer-readable storage media of claim 1, the operations further comprising outputting the second reminder at the first device responsive to predicting the first device will be at the second reminder location.

4. The one or more non-transitory computer-readable storage media of claim 1, wherein the second reminder message is a text message.

5. The one or more non-transitory computer-readable storage media of claim 1, wherein receiving a second reminder from a second device comprises receiving the second reminder over a cellular communications network.

6. The one or more non-transitory computer-readable storage media of claim 1, the operations further comprising identifying when the current location of the second device is at the second reminder location and responsively outputting the second reminder message at the second device.

7. A method comprising:
  storing a reminder message associated with a reminder location;
  tracking a current location of a plurality of subscribing devices;
  identifying when a subscribing device of the plurality of subscribing devices is at or in proximity to a reminder location;
  alerting a user of the subscriber device a reminder message is available;
  providing the user with an option to defer the reminder;
  utilizing the subscriber device to retrieve the reminder message from a cloud connected device;
  outputting the reminder message at the subscribing device, wherein the reminder message is input at a first subscribing device of the plurality of subscribing devices and output at a second subscribing device of the plurality of subscribing devices; and
  outputting an update message at the first subscribing device indicating that the reminder message has been output at the second subscribing device.

8. The method of claim 7, wherein the reminder message comprises a message originator.

9. The method of claim 7, wherein the reminder message is synchronized across the plurality of subscribing devices.

10. The method of claim 7, wherein a subscribing device retrieves the reminder message when it is at or in proximity to the reminder location.

11. A method comprising:
  receiving a first reminder from a first device, the first reminder comprising a first reminder message and a first reminder location;
  storing the first reminder;
  receiving a second reminder from a second device, the second reminder comprising a second reminder message and a second reminder location;
  storing the second reminder;
  tracking a current location of the first device and a current location of the second device;
  identifying when the current location of the first device is at the second reminder location and responsively outputting the second reminder message at the first device; and
  outputting an update message at the second device indicating the second reminder message has been delivered to the first device at the second reminder location.

12. The method of claim 11, wherein outputting the second reminder message at the first device comprises transmitting the second reminder message over a network to the first device.

13. The method of claim 11, further comprising outputting the second reminder at the first device responsive to predicting the first device will be at the second reminder location.

14. The method of claim 11, wherein the second reminder message is a text message.

\* \* \* \* \*